United States Patent
Bellato et al.

(10) Patent No.: US 7,395,811 B2
(45) Date of Patent: Jul. 8, 2008

(54) CHOKE DEVICE FOR AN INTERNAL COMBUSTION ENGINE INTAKE SYSTEM

(75) Inventors: Nazario Bellato, Bologna (IT); Sandro Sirani, San Benedetto Val Di Sambro (IT); Marcello Colli, Reggio Emilia (IT); Eugenio Dragoni, Lugo (IT)

(73) Assignee: Magneti Marelli Powertrain S.P.A., Corbetta (IT)

( * ) Notice: Subject to any disclaimer, the term of this patent is extended or adjusted under 35 U.S.C. 154(b) by 64 days.

(21) Appl. No.: 11/601,190

(22) Filed: Nov. 17, 2006

(65) Prior Publication Data

US 2007/0163544 A1    Jul. 19, 2007

(30) Foreign Application Priority Data

Nov. 25, 2005    (EP) .................... 05425834

(51) Int. Cl.
*F02D 9/10*    (2006.01)
*F02M 1/00*    (2006.01)

(52) U.S. Cl. .............. 123/442; 123/179.18; 123/184.56

(58) Field of Classification Search ................. 123/336, 123/337, 302, 306, 308, 432, 442, 179.18, 123/184.54, 184.56
See application file for complete search history.

(56) References Cited

U.S. PATENT DOCUMENTS

| 4,207,854 | A |   | 6/1980 | Alford et al. |
| 4,577,602 | A | * | 3/1986 | Showalter ................... 123/306 |
| 4,858,567 | A |   | 8/1989 | Knapp |
| 5,417,367 | A |   | 5/1995 | Baclet et al. |
| 6,439,547 | B1 | * | 8/2002 | King et al. ..................... 261/52 |
| 6,848,405 | B1 | * | 2/2005 | Dow et al. ............. 123/179.18 |
| 7,089,909 | B2 | * | 8/2006 | Moschini et al. ............ 123/306 |
| 2001/0023677 | A1 |   | 9/2001 | Fujieda et al. |
| 2003/0150422 | A1 |   | 8/2003 | Huh |
| 2007/0131200 | A1 | * | 6/2007 | Matsuda et al. .............. 123/438 |

FOREIGN PATENT DOCUMENTS

| DE | 3900477 | 7/1990 |
| DE | 29924529 | 8/2003 |
| EP | 1568866 | 8/2005 |
| FR | 2711949 | 5/1995 |
| FR | 2713361 | 6/1995 |
| GB | 2084250 | 4/1982 |

OTHER PUBLICATIONS

Patent Abstracts of Japan, JP 03191249 (Misawa Homes Co. Ltd.), Aug. 21, 1991.

* cited by examiner

*Primary Examiner*—Willis R. Wolfe, Jr.
*Assistant Examiner*—Johnny H. Hoang
(74) *Attorney, Agent, or Firm*—Robert P. Lenart, Esq.; Pietragallo Gordon Alfano Bosick & Raspanti, LLP

(57) ABSTRACT

A choke device for an intake system of an internal combustion engine; the choke device has at least one choke body fitted movably inside an intake conduit, and an actuating device for moving the choke body to and from a work position in which the choke body reduces the cross section of the intake conduit; and the actuating device has a filiform actuating member made of a shape-memory material that changes shape when subjected to physical external stress, and having a first portion embedded in the choke body, and a second portion located outside the choke body and secured mechanically to a fixed part.

27 Claims, 3 Drawing Sheets

CHOKE DEVICE FOR AN INTERNAL COMBUSTION ENGINE INTAKE SYSTEM

The present invention relates to a choke device for an internal combustion engine intake system.

BACKGROUND OF THE INVENTION

An internal combustion engine has a number of cylinders, each connected to an intake manifold by at least one intake valve, and to an exhaust manifold by at least one exhaust valve. The intake manifold is supplied with fresh air (i.e. from outside) by a feed conduit fitted with a throttle valve, and is connected to the cylinders by respective intake conduits, each terminating at least one intake valve.

A choke device has recently been proposed to adjust the cross section of the intake conduits as a function of engine speed (i.e. drive shaft rotation speed). At low speed, the airflow section of the intake conduits is reduced to generate turbulence in the air intake and so improve mixing of the air and fuel in the cylinders, so that all the injected fuel is burnt, thus reducing combustion-generated pollutant emissions. At high speed, the airflow section of the intake conduits is maximized to fill the cylinders completely and achieve maximum power.

Choke devices as described above may be tumble types, referred to simply as tumble devices, or swirl types, referred to simply as swirl devices. A tumble device employs, for each intake conduit, a choke body movable to and from an active position in which the choke body reduces the cross section of the intake conduit. In a swirl system, each intake conduit comprises two parallel, side by side channels, and, for each intake conduit, a choke body is used which is movable to and from an active position completely closing one of the two intake conduit channels.

In currently marketed choke devices, all the choke bodies are fitted to a common shaft to rotate together to and from the work position under the control of a common actuator, which simultaneously and synchronously controls the position of all the choke bodies. The actuator is defined by an electric motor having a rotor connected mechanically to the common shaft. This solution, however, is relatively heavy, is relatively bulky (also on account of the electronics controlling the electric motor), and is only sufficiently, though not particularly, dependable (due to frequent malfunctioning of the electronics controlling the electric motor). In currently marketed engines, it has also been proposed to operate the common shaft using a pneumatic actuator. This solution, however, is also relatively heavy and, above all, extremely bulky.

EP1568866 discloses a choke valve for an intake manifold with a retracting tumble system for an engine provided with a number of cylinders. The choke valve is adapted to vary the passage section of the air through an intake duct which connects each cylinder with the intake manifold and is regulated by at least one intake valve; the choke valve comprises a butterfly mounted to rotate about an axis of rotation disposed transversely and externally with respect to the corresponding intake duct under the thrust of a corresponding rotary electric motor which comprises a stator and a rotor housed directly in the butterfly.

SUMMARY OF THE INVENTION

It is an object of the present invention to provide a choke device, for an internal combustion engine intake system, designed to eliminate the aforementioned drawbacks, and which, in particular, is cheap and easy to produce.

According to the present invention, there is provided a choke device for an internal combustion engine intake system, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
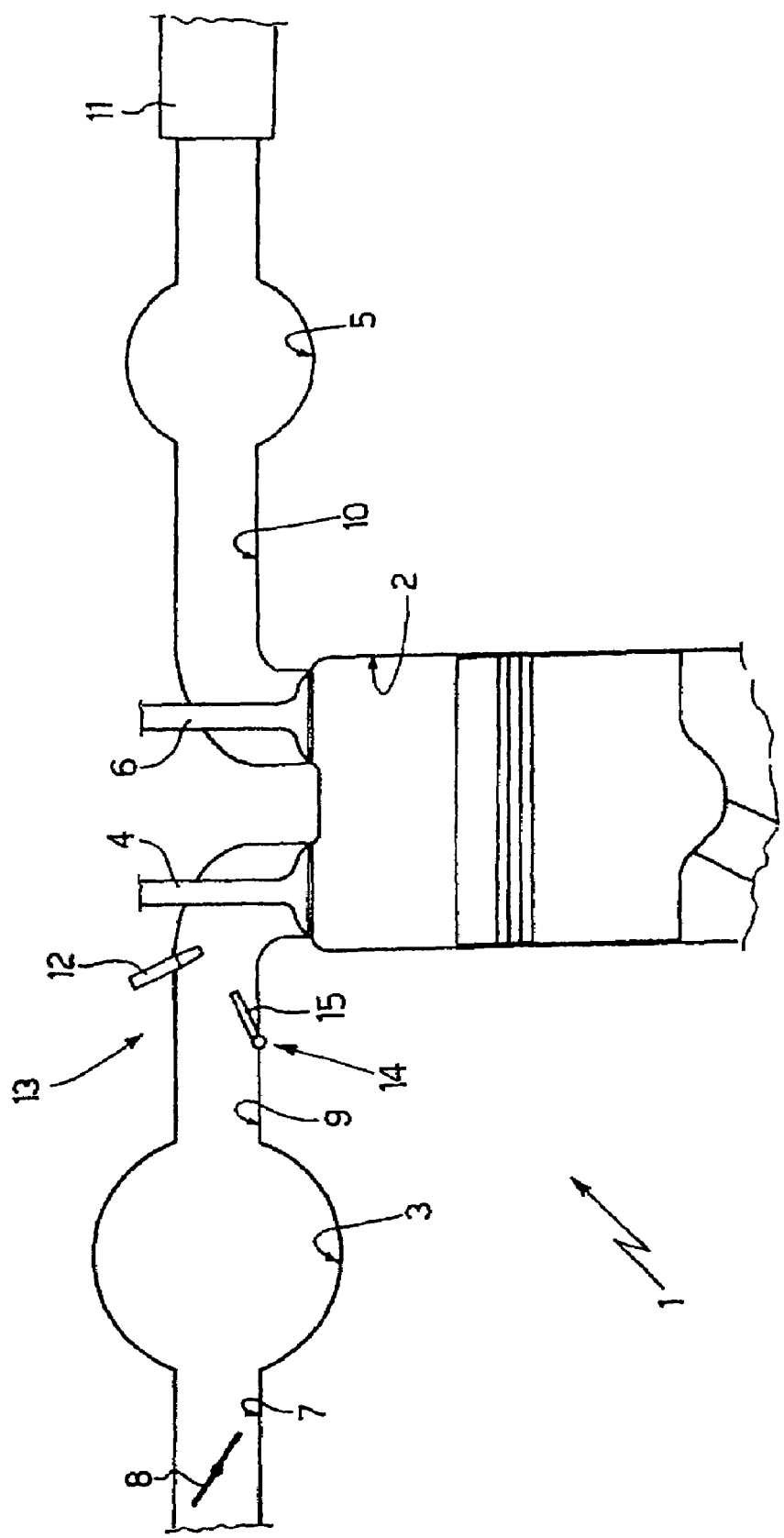
FIG. 1 shows a schematic view of an internal combustion engine having an intake system equipped with a choke device in accordance with the present invention.

Number 1 in FIG. 1 indicates as a whole an internal combustion engine having four cylinders 2 (only one shown in FIG. 1), each of which is connected to an intake manifold 3 by at least one intake valve 4, and to an exhaust manifold 5 by at least one exhaust valve 6.

Intake manifold 3 is supplied with fresh air (i.e. from outside) by a feed conduit 7 regulated by a throttle valve 8, and is connected to cylinders 2 by respective intake conduits 9 (only one shown in FIG. 1), each of which is regulated by the corresponding intake valve 4. Similarly, exhaust manifold 5 is connected to cylinders 2 by respective exhaust conduits 10 (only one shown in FIG. 1), each of which is regulated by the corresponding exhaust valve 6; and an exhaust pipe 11 extends from exhaust manifold 5 and terminates with a known muffler (not shown) to expel combustion gases into the atmosphere.

In the embodiment shown, fuel (e.g. petrol, diesel fuel, methane, LPG, . . . ) is injected into each intake conduit 9 by an injector 12 located close to intake valve 4. In an alternative embodiment not shown, injectors 12 are so located as to inject fuel directly into cylinders 2.

Figure 2:
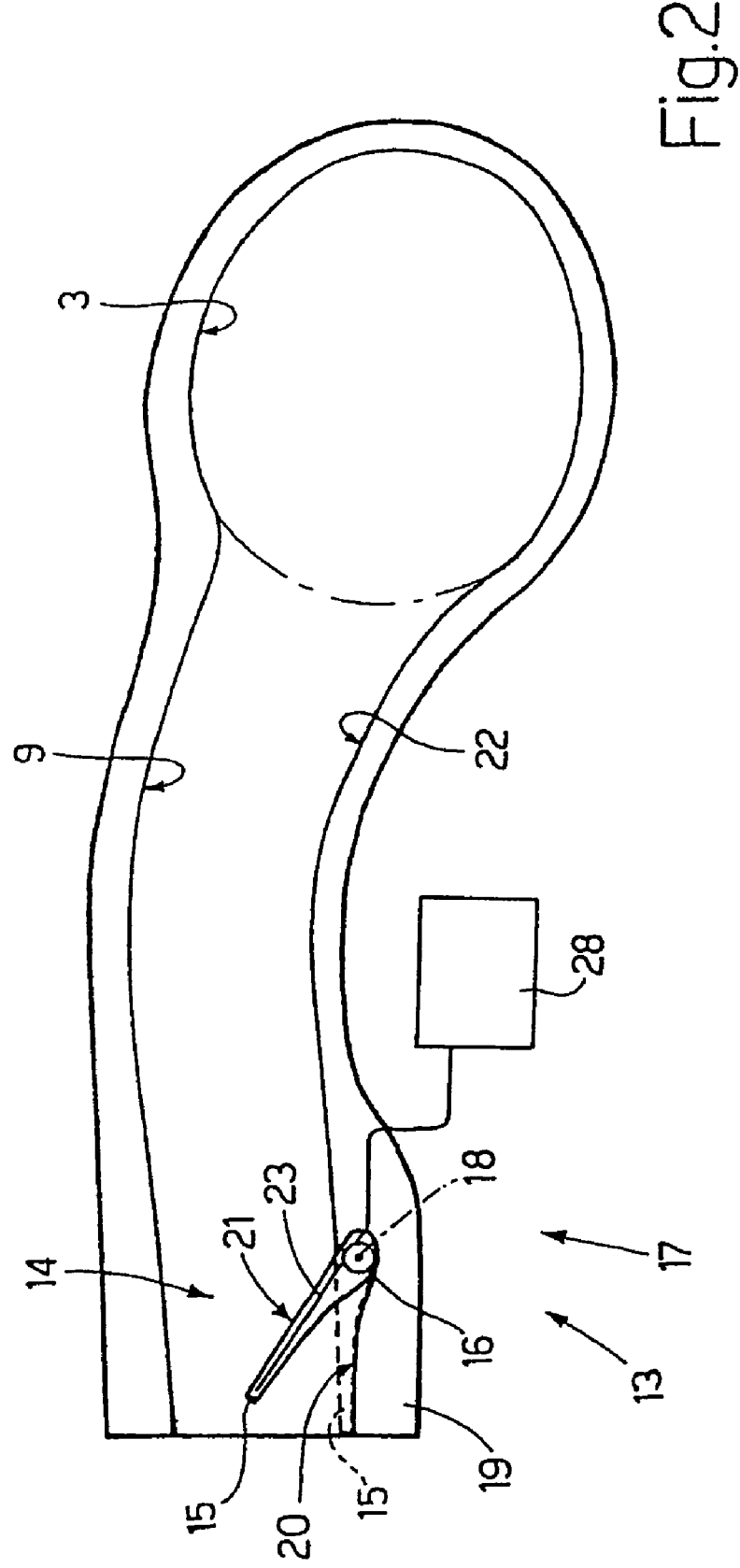
FIG. 2 shows a larger-scale view, with parts removed for clarity, of the FIG. 1 intake system.

Intake manifold 3 comprises a tumble-type choke device 13 (referred to simply as tumble device 13), which adjusts the cross section of intake conduits 9 as a function of the speed of engine 1. As shown in FIG. 2, for each intake conduit 9, tumble device 13 comprises a choke valve 14 having a choke body 15 or throttle 15 fitted to a respective shaft 16 and rotated by a respective actuating device 17 about an axis 18 crosswise to and outside the corresponding intake conduit 9. It is important to note that each choke valve 14 is mechanically independent of the other choke valves 14, i.e. throttles 15 of the four choke valves 14 are not connected mechanically to one another, and rotate freely with respect to one another.

In actual use, each throttle 15 is rotated by respective actuating device 17 between a fully extracted position (shown by the continuous line in FIG. 2), in which throttle 15 reduces the airflow section of intake conduit 9 to a minimum, and a rest position (shown by the dash line in FIG. 2), in which throttle 15 in no way reduces the airflow section of intake conduit 9.

Shaft 16 of each throttle 15 is embedded in a wall 19 of intake conduit 9, and rotates about axis 18 of rotation; and wall 19 of each intake conduit 9 has a seat 20 for housing throttle 15 when throttle 15 is in the rest position. When throttle 15 is in the rest position, a top surface 21 of throttle 15 defines a continuation of an inner surface 22 of intake conduit 9, and blends substantially seamlessly with inner surface 22. More specifically, in the rest position, top surface 21 of each throttle 15 is substantially parallel to the central axis of intake conduit 9; and, in the fully extracted position, top surface 21 of each throttle 15 forma a roughly 30-45° angle with the central axis of intake conduit 9.

Figure 3:
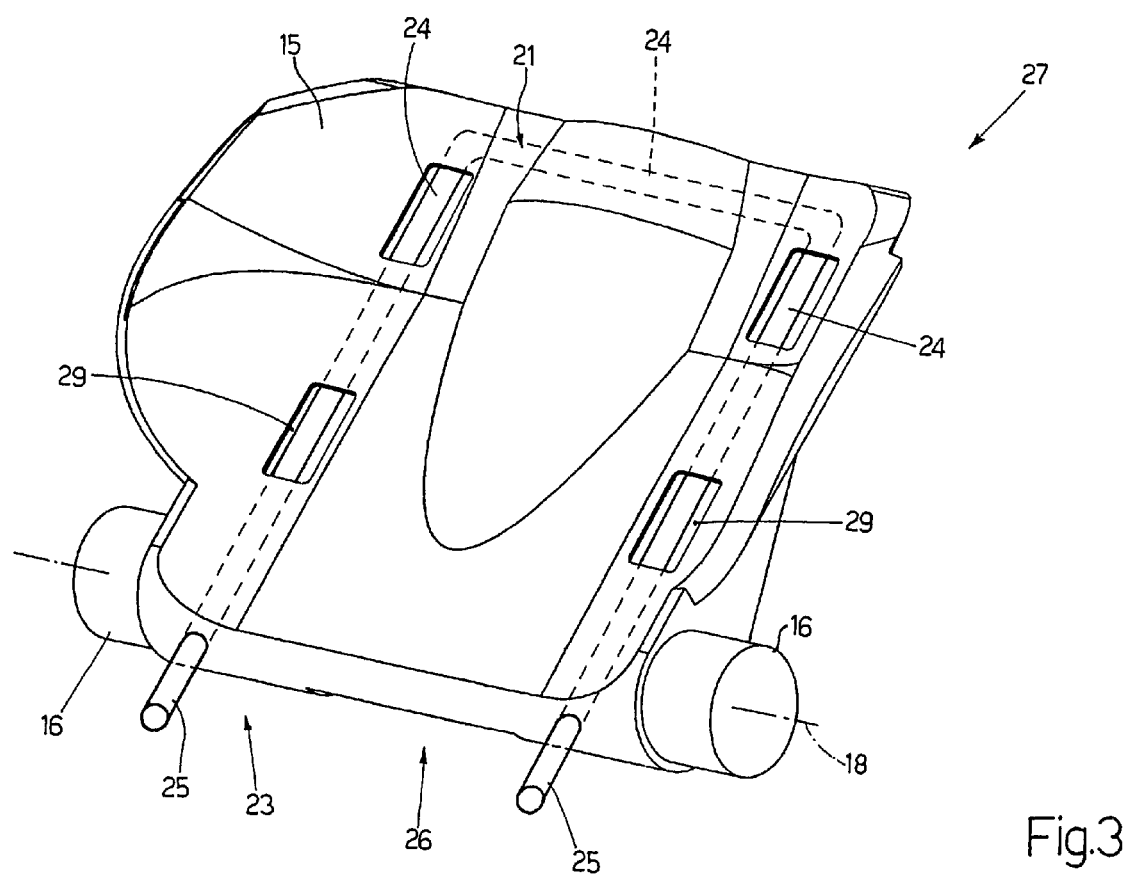
FIG. 3 shows a schematic view in perspective of a choke body of the FIG. 1 choke device.

As shown in FIGS. 2 and 3, each actuating device 17 comprises a filiform actuating member 23 made of shape-memory material, and which is energized by heating to change shape and so rotate throttle 15 about axis 18 of rotation.

A shape-memory material is a metal alloy capable of changing a physical characteristic when subjected to physical external stress. More specifically, metal alloys (e.g. nickel-titanium or a copper alloy) capable of changing size when heated are used. In other words, the shape of actuating member 23 is changed by heating (i.e. increasing the temperature of) actuating member 23.

Actuating member 23 has a given length at ambient temperature, but, when the temperature of actuating member 23 exceeds a predetermined temperature threshold (depending on the chemical-physical characteristics of the material), is shortened by a predetermined amount (depending on the chemical-physical characteristics of the material), thus reducing the distance between the opposite ends of actuating member 23. Actuating member 23 works "two-way", i.e. grows shorter when heated, and grows spontaneously longer to return to its original size when cooled.

Actuating member 23 is U-shaped, and comprises a portion 24 embedded in throttle 15; and a portion 25 outside throttle 15 and secured mechanically to a fixed part, in particular, to wall 19 of intake conduit 9. At ambient temperature, actuating member 23 is of such a length as to keep throttle 15 in the rest position. When the temperature of actuating member 23 exceeds the given temperature threshold, actuating member 23 is shortened by a predetermined amount; and, since portion 25 of actuating member 23 is secured mechanically to wall 19 of intake conduit 9, the reduction in the length of actuating member 23 draws throttle 15 towards wall 19 of intake conduit 9, thus rotating throttle 15 about axis 18 of rotation and so moving throttle 15 from the rest position to the fully extracted position. Similarly, the increase in the length of actuating member 23, when actuating member 23 is cooled, rotates throttle 15 in the opposite direction about axis 18 of rotation, thus moving throttle 15 from the fully extracted position to the rest position.

For the changes in the length of actuating member 23 to rotate throttle 15 about axis 18 of rotation, actuating member 23 is preferably slightly eccentric with respect to axis 18 of rotation.

Portion 24 of actuating member 23 being embedded in throttle 15, the reduction in length of actuating member 23 tends to deform throttle 15. To prevent excessive mechanical stress of actuating member 23 and throttle 15, it is preferable that throttle 15 deform without overly resisting, and to comply with, the reduction in length of actuating member 23. For which purpose, at least one deformable portion 26 of throttle 15 is deformable elastically without undergoing damage and without requiring excessive mechanical stress of actuating member 23 and the remaining, rigid, non-elastically-deformable, portion 27 of throttle 15. The deformable portion 26 of throttle 15 is preferably located at wall 19 of intake conduit 9, and is smaller than the remaining rigid portion 27 of throttle 15.

Throttle 15 is normally made of molded plastic material (polymer), and is produced by co-molding the plastic material together with actuating member 23. In a first embodiment, a first rigid plastic material is used to produce rigid portion 27 of throttle 15, and a second deformable plastic material is used to produce deformable portion 26 of throttle 15. Alternatively, one plastic material may be used for both rigid portion 27 and deformable portion 26 of throttle 15, but of one density and/or thickness for rigid portion 27, and a different density and/or thickness for deformable portion 26.

Actuating member 23 is connected to an energizing device 28 for heating actuating member 23 sufficiently to raise the temperature of actuating member 23 above said temperature threshold. Energizing device 29 applies a voltage between the ends of actuating member 23 to produce electric current flow along actuating member 23 and so heat actuating member 23 by virtue of the Joule effect.

To assist cooling of actuating member 23 once heating by energizing device 28 is cut off, throttle 15 has a number of ventilation holes 29 formed at actuating member 23 to expose part of actuating member 23 to the fresh-air stream flowing inside intake conduit 9. In actual use, the fresh-air stream inside intake conduit 9 flows, through ventilation holes 29, over part of actuating member 23 to rapidly cool actuating member 23 once heating by energizing device 28 is cut off. Ventilation holes 29 may be either through holes, i.e. through throttle 15 at actuating member 23, or dead holes.

In the preferred embodiment shown in FIG. 3, one U-shaped actuating member 23 is embedded inside each throttle 15. In an alternative embodiment not shown, more than one actuating member 23 may be embedded inside each throttle 15. In yet a further embodiment not shown, actuating member 23 may be other than U-shaped.

The construction solution described above has numerous advantages: it is cheap and easy to produce and, as compared with a conventional electric or pneumatic embodiment, is more straightforward and much lighter, more compact, and more reliable. Tests have shown the power requirement and energy consumption of tumble device 13 as described above to be very low, and much lower than a conventional electric-motor embodiment. More specifically, in actual use, the four actuating devices 7 described above may operate with a total power of less than 10 watts, as compared with over 40 watts in the case of a conventional electric-motor actuating device.

The invention claimed is:

1. A choke device (13) for an intake system of an internal combustion engine (1); the intake system comprising at least one intake manifold (3), and a number of intake conduits (9), each of which connects the intake manifold (3) to at least one cylinder (2) of the internal combustion engine (1); the choke device (13) comprising at least one choke body (15) housed inside an intake conduit (9), and an actuating device (17) for setting the choke body (15) to a work position in which the choke body (15) reduces the cross section of the intake conduit (9);

the choke device (13) being characterized in that the actuating device (17) comprises at least one filiform actuating member (23) made of a shape-memory material that changes shape when subjected to physical external stress, and comprising a first portion (24) embedded in the choke body (15), and a second portion (25) located outside the choke body (15) and secured mechanically to a fixed part; and the choke body (15) is deformable elastically to comply with the reduction in length of the actuating member (23).

2. A choke device (13) as claimed in claim 1, wherein the second portion (25) of the actuating member (23), located outside the choke body (15), is secured mechanically to a wall (19) of the intake conduit (9).

3. A choke device (13) as claimed in claim 1, wherein the actuating member (23) changes in length when heated.

4. A choke device (13) as claimed in claim 3, wherein the actuating member (23) is shortened when the temperature of the actuating member (23) exceeds a predetermined temperature threshold.

5. A choke device (13) as claimed in claim 4, wherein the actuating member (23) works "two-way", i.e. grows shorter when heated, and grows spontaneously longer to return to its original size when cooled.

6. A choke device (13) as claimed in claim 1, wherein the choke body (15) comprises at least one deformable portion (26) which is deformable elastically; and a remaining rigid portion (27) which is not deformable elastically.

7. A choke device (13) as claimed in claim 6, wherein the deformable portion (26) of the choke body (15) is located at a wall (19) of the intake conduit (9).

8. A choke device (13) as claimed in claim 6, wherein the deformable portion (26) of the choke body (15) is smaller than the remaining rigid portion (27).

9. A choke device (13) as claimed in claim 6, wherein the rigid portion (27) of the choke body (15) is made of a rigid first plastic material, and the deformable portion (26) of the choke body (15) is made of a deformable second plastic material.

10. A choke device (13) as claimed in claim 6, wherein the choke body (15) is made of a single plastic material.

11. A choke device (13) as claimed in claim 9, wherein the rigid portion (27) of the choke body (15) is of greater density than the deformable portion (26) of the choke body (15).

12. A choke device (13) as claimed in claim 9, wherein the rigid portion (27) of the choke body (15) is of greater thickness than the deformable portion (26) of the choke body (15).

13. A choke device (13) as claimed in claim 1, wherein the actuating member (23) is U-shaped.

14. A choke device (13) as claimed in claim 1, wherein the actuating device (17) comprises an energizing device (28) for feeding electric current through the actuating member (23) to heat the actuating member (23) by virtue of the Joule effect.

15. A choke device (13) as claimed in claim 1, wherein the choke body (15) comprises at least one ventilation hole (29) formed at the actuating member (23) to expose part of the actuating member (23) to the fresh-air stream inside the intake conduit (9).

16. A choke device (13) as claimed in claim 15, wherein the ventilation hole (29) is a through hole through the choke body (15).

17. A choke device (13) as claimed in claim 15, wherein the ventilation hole (29) is a dead hole.

18. A choke device (13) as claimed in claim 1, wherein the actuating device (17) comprises a number of actuating members (23).

19. A choke device (13) as claimed in claim 1, wherein the choke body (15) is mounted on a shaft (16) and rotated by the actuating device (17) about an axis (18) of rotation.

20. A choke device (13) as claimed in claim 19, wherein the actuating member (23) is eccentric with respect to the axis (18) of rotation.

21. A choke device (13) as claimed in claim 20, wherein the axis (18) of rotation of the choke body (15) is located outside the intake conduit (9), so that, in a rest position, the choke body (15) makes no reduction in the airflow section of the intake conduit (9).

22. A choke device (13) as claimed in claim 21, wherein the shaft (16) of the choke body (15) is embedded in a wall (19) of the intake conduit (9).

23. A choke device (13) as claimed in claim 22, wherein the wall (19) of the intake conduit (9) has a seat (20) for housing the choke body (15) when the choke body (15) is in a rest position.

24. A choke device (13) for an intake system of an internal combustion engine (1); the intake system comprising at least one intake manifold (3), and a number of intake conduits (9), each of which connects the intake manifold (3) to at least one cylinder (2) of the internal combustion engine (1); the choke device (13) comprising at least one choke body (15) housed inside an intake conduit (9), and an actuating device (17) for setting the choke body (15) to a work position in which the choke body (15) reduces the cross section of the intake conduit (9);

the choke device (13) being characterized in that the actuating device (17) comprises at least one U-shaped filiform actuating member (23) made of a shape-memory material that changes shape when subjected to physical external stress, and comprising a first portion (24) embedded in the choke body (15), and a second portion (25) located outside the choke body (15) and secured mechanically to a fixed part.

25. A choke device (13) for an intake system of an internal combustion engine (1); the intake system comprising at least one intake manifold (3), and a number of intake conduits (9), each of which connects the intake manifold (3) to at least one cylinder (2) of the internal combustion engine (1); the choke device (13) comprising at least one choke body (15) housed inside an intake conduit (9), and an actuating device (17) for setting the choke body (15) to a work position in which the choke body (15) reduces the cross section of the intake conduit (9);

the choke device (13) being characterized in that the actuating device (17) comprises at least one filiform actuating member (23) made of a shape-memory material that changes shape when subjected to physical external stress, and comprising a first portion (24) embedded in the choke body (15), and a second portion (25) located outside the choke body (15) and secured mechanically to a fixed part; and the choke body (15) comprises at least one ventilation hole (29) formed at the actuating member (23) to expose part of the actuating member (23) to the fresh-air stream inside the intake conduit (9).

26. A choke device (13) as claimed in claim 25, wherein the ventilation hole (29) is a through hole through the choke body (15).

27. A choke device (13) as claimed in claim 26, wherein the ventilation hole (29) is a dead hole.

* * * * *